United States Patent
Kim et al.

(10) Patent No.: US 10,148,811 B2
(45) Date of Patent: Dec. 4, 2018

(54) ELECTRONIC DEVICE AND METHOD FOR CONTROLLING VOICE SIGNAL

(71) Applicant: Samsung Electronics Co., Ltd., Gyeonggi-do (KR)

(72) Inventors: Gang-Youl Kim, Gyeonggi-do (KR); Jun-Tai Kim, Gyeonggi-do (KR); Min-Ho Bae, Seoul (KR); Beak-Kwon Son, Gyeonggi-do (KR); Jung-Yeol An, Seoul (KR); Chul-Min Choi, Seoul (KR); Yang-Su Kim, Gyeonggi-do (KR); Jae-Mo Yang, Gyeonggi-do (KR); Nam-Woog Lee, Gyeonggi-do (KR); Keun-Won Jang, Gyeonggi-do (KR); Hyun-Min Choi, Chungcheongbuk-do (KR)

(73) Assignee: Samsung Electronics Co., Ltd (KR)

( * ) Notice: Subject to any disclaimer, the term of this patent is extended or adjusted under 35 U.S.C. 154(b) by 65 days.

(21) Appl. No.: 15/362,150

(22) Filed: Nov. 28, 2016

(65) Prior Publication Data
US 2017/0155756 A1    Jun. 1, 2017

(30) Foreign Application Priority Data
Nov. 27, 2015    (KR) .......................... 10-2015-0168008

(51) Int. Cl.
| | | |
|---|---|---|
| *H04M 3/00* | (2006.01) |
| *H04M 9/08* | (2006.01) |
| *G10L 21/0208* | (2013.01) |
| *H04B 3/23* | (2006.01) |
| *G10L 21/0216* | (2013.01) |

(52) U.S. Cl.
CPC ......... *H04M 3/002* (2013.01); *G10L 21/0208* (2013.01); *H04M 9/085* (2013.01); *G10L 2021/02165* (2013.01); *H04B 3/23* (2013.01)

(58) Field of Classification Search
CPC ................................................ H04M 3/002
USPC ................ 379/406.06, 406.01, 406.07, 430; 381/57, 71.1, 74, 92, 94.1, 66, 300; 455/569.2, 550.1; 704/258
See application file for complete search history.

(56) References Cited

U.S. PATENT DOCUMENTS

| | | | |
|---|---|---|---|
| 4,536,887 A * | 8/1985 | Kaneda .................. | H04R 3/005 381/356 |
| 5,859,826 A | 1/1999 | Ueno et al. | |

(Continued)

*Primary Examiner* — Gerald Gauthier
(74) *Attorney, Agent, or Firm* — The Farrell Law Firm, P.C.

(57) ABSTRACT

A method, device, a non-transitory computer-readable recording medium for controlling a voice signal by an electronic device including a first microphone, a second microphone, a communication interface, and a processor are provided. The method includes acquiring a first voice signal by using the first microphone; acquiring a second voice signal by using the second microphone; confirming a telephone call mode for performing, by the electronic device, a telephone call with an external electronic device; adjusting a first output attribute corresponding to the first voice signal or a second output attribute corresponding to the second voice signal, based on the telephone call mode; and transmitting the adjusted first voice signal or the adjusted second voice signal to the external electronic device by using the communication interface.

19 Claims, 11 Drawing Sheets

(56) References Cited

U.S. PATENT DOCUMENTS

| | | | | |
|---|---|---|---|---|
| 8,189,766 B1* | 5/2012 | Klein | H04M 9/085 | 379/406.07 |
| 8,355,511 B2* | 1/2013 | Klein | H04M 9/082 | 379/406.14 |
| 8,363,823 B1* | 1/2013 | Santos | H04R 1/1041 | 379/430 |
| 8,472,616 B1* | 6/2013 | Jiang | H04M 9/082 | 370/286 |
| 8,861,756 B2* | 10/2014 | Zhu | H04R 3/005 | 381/300 |
| 9,197,974 B1* | 11/2015 | Clark | H04M 9/08 | |
| 9,237,391 B2* | 1/2016 | Benesty | H04R 1/406 | |
| 2006/0079271 A1 | 4/2006 | Lee | | |
| 2007/0147630 A1* | 6/2007 | Chiloyan | H04M 1/6066 | 381/74 |
| 2010/0195838 A1* | 8/2010 | Bright | H04M 1/03 | 381/57 |
| 2012/0045074 A1* | 2/2012 | Li | G10L 21/0208 | 381/94.1 |
| 2012/0150542 A1* | 6/2012 | Ma | H04S 3/008 | 704/258 |
| 2014/0050333 A1* | 2/2014 | Li | H04R 1/08 | 381/92 |
| 2014/0094228 A1* | 4/2014 | Hamelink | H04M 1/6091 | 455/569.2 |
| 2014/0098972 A1* | 4/2014 | Yamada | H04R 29/006 | 381/92 |
| 2014/0355775 A1* | 12/2014 | Appelbaum | H04R 3/002 | 381/71.1 |
| 2015/0024799 A1* | 1/2015 | Swanson | H04R 1/46 | 455/550.1 |
| 2015/0365759 A1* | 12/2015 | Dimitriadis | G06K 9/00684 | 381/71.1 |
| 2017/0155756 A1* | 6/2017 | Kim | H04M 3/002 | |
| 2018/0184907 A1* | 7/2018 | Tran | G06F 19/3418 | |

* cited by examiner

ELECTRONIC DEVICE AND METHOD FOR CONTROLLING VOICE SIGNAL

This application claims priority under 35 U.S.C. § 119(a) to a Korean Patent Application filed on Nov. 27, 2015 in the Korean Intellectual Property Office and assigned Serial No. 10-2015-0168008, the entire content of which is incorporated herein by reference.

BACKGROUND

1. Field of the Disclosure

The present disclosure relates generally to an electronic device and a method of controlling a voice signal, and more particularly to, an electronic device and a method of controlling a voice signal which preprocesses and/or post-processes a voice signal when the electronic device performs a telephone call using multiple channels with an external electronic device.

2. Description of the Related Art

Due to excessive costs, instability of a communication network, and/or limitations on the range of bandwidth of the communication network, a mono telephone call scheme for transmitting and receiving voice signals between multiple telephone call devices through one channel has been used.

With the progress of mobile communication technology, according to an improvement in the stability of the communication network and/or an increase in the bandwidth thereof, a telephone call may be performed through a long term evolution (LTE) network or a wireless fidelity (WiFi) communication network, and data delivery technology has progressed. Accordingly, the use of a multi-channel (stereo) telephone call scheme capable of providing a user with a voice signal of good quality has increased.

For example, only a voice signal having a bandwidth of 0 to 8 kHz may be delivered, or voice signal data having a bandwidth of 0 to 16 kHz may be delivered when a communication network has a good state. However, in the future, the transmission and/or reception of voice signal data having a bandwidth of 0 to 32 kHz or 48 kHz may be provided.

According to an increase in the transmission bandwidth of a communication network, there is an increase in a desire to listen to a voice signal of high quality during an image call and/or a voice call, and a multi-channel telephone call has been proposed which allows multiple channels (e.g., a 5.1 channel, a 7.1 channel, etc.), which have been used for listening to music, to be applied to a voice call.

Pre-processing (e.g., noise suppression, etc.) used during a telephone call may be applied to a mono telephone call scheme for transmitting and receiving voice signals through one channel. When the pre-processing is applied to the mono telephone call scheme, although multiple microphones or multiple speakers are used, the pre-processing is used only to suppress a disturbance signal and there may be difficulty in effectively using the multiple microphones or multiple speakers. In addition, pre-processing applied to a mono telephone call scheme has difficulty in providing post-processing to a voice signal received by a reception-side device.

SUMMARY

Various embodiments of the present disclosure may provide an electronic device that may pre-process each of multiple voice signals acquired through multiple microphones functionally connected to an electronic device (e.g., a transmission-side device), which enables another electronic device (e.g., a reception-side device) to perform post-processing. In addition, various embodiments of the present disclosure may provide, for example, a method of controlling a voice signal by an electronic device, and the electronic device.

In accordance with an aspect of the present disclosure, a method for controlling a voice signal by an electronic device including a first microphone, a second microphone, a communication interface, and a processor is provided. The method includes acquiring a first voice signal by using the first microphone; acquiring a second voice signal by using the second microphone; confirming a telephone call mode for performing, by the electronic device, a telephone call with an external electronic device; adjusting a first output attribute corresponding to the first voice signal or a second output attribute corresponding to the second voice signal, based on the telephone call mode; and transmitting the adjusted first voice signal or the adjusted second voice signal to the external electronic device by using the communication interface.

In accordance with another aspect of the present disclosure, an electronic device is provided. The electronic device includes a first microphone and a second microphone; a communication interface; and a processor, wherein the processor is configured to acquire a first voice signal by using the first microphone and acquire a second voice signal by using the second microphone; confirm a telephone call mode for performing a telephone call with an external electronic device; adjust a first output attribute corresponding to the first voice signal or a second output attribute corresponding to the second voice signal, based on the telephone call mode; and transmit the adjusted first voice signal or the adjusted second voice signal to the external electronic device by using the communication interface.

In accordance with another aspect of the present disclosure, a non-transitory computer-readable recording medium storing a program executed by a processor in an electronic device including a first microphone, a second microphone, a communication interface, a sensor, and the processor is provided, wherein the program causes the processor to execute a method. The method includes acquiring a first voice signal by using the first microphone, and acquiring a second voice signal by using the second microphone; confirming distance information or direction information on a source of a corresponding voice signal among the first voice signal and the second voice signal, by using the sensor; adjusting a first output attribute corresponding to the first voice signal or a second output attribute corresponding to the second voice signal, based on the distance information or the direction information; and transmitting the adjusted first voice signal or the adjusted second voice signal to an external electronic device by using the communication interface.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENT OF THE PRESENT DISCLOSURE

Figure 1:
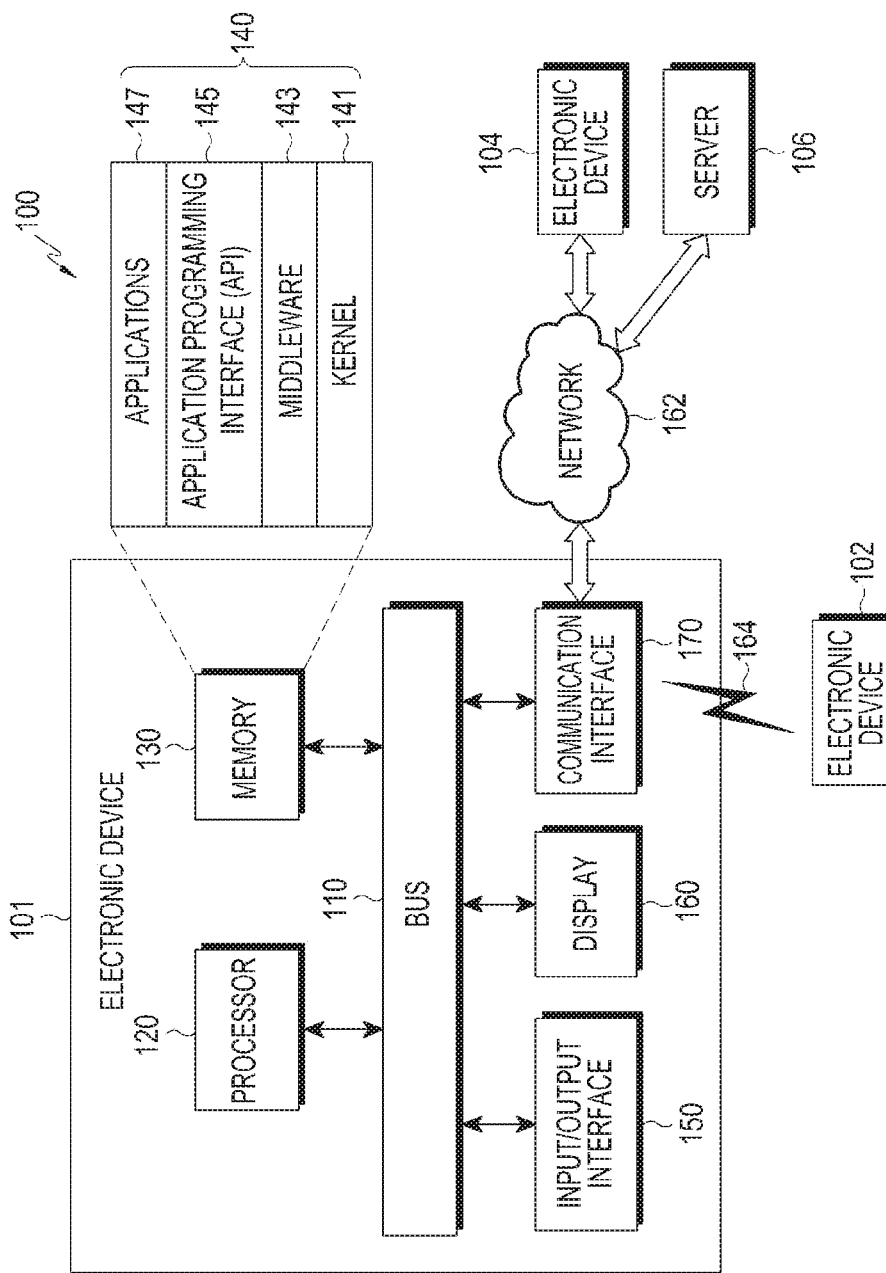
FIG. 1 is a block diagram of a system in an environment of a network according to an embodiment of the present disclosure.

Hereinafter, various embodiments of the present disclosure are described with reference to the accompanying drawings. However, it should be understood that there is no intent to limit the present disclosure to the particular forms disclosed herein; rather, the present disclosure is intended to be construed to cover various modifications, equivalents, and/or alternatives of the present disclosure. In describing the accompanying drawings, similar reference numerals may be used to designate similar elements.

As used herein, the expressions "have," "may have," "include," or "may include" refer to the existence of a corresponding feature (e.g., a numeral, a function, an operation, or an element such as a component), but do not exclude one or more additional features.

In the present disclosure, the expressions "A or B," "at least one of A and/or B," or "one or more of A and/or B" may include all possible combinations of the items listed. For example, the expressions "A or B," "at least one of A and B," or "at least one of A or B" refer to all of (1) including at least one A, (2) including at least one B, and (3) including all of at least one A and at least one B.

The expressions "a first," "a second," "the first," or "the second" used in an embodiment of the present disclosure may modify various components regardless of the order and/or the importance but does not limit the corresponding components. For example, a first user device and a second user device indicate different user devices although both of them are user devices. For example, a first element may be referred to as a second element, and similarly, a second element may be referred to as a first element without departing from the scope and spirit of the present disclosure.

It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposed there between. In contrast, it should be understood that when an element (e.g., the first element) is referred to as being "directly connected," or "directly coupled" to another element (e.g., the second element), there is no element (e.g., the third element) interposed there between.

The expression "configured to" used in the present disclosure may be used interchangeably with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may indicate that the device, together with other devices or components, "is able to." For example, the phrase "processor adapted (or configured) to perform A, B, and C" may indicate a dedicated processor (e.g. an embedded processor) for performing only the corresponding operations, or a general purpose processor (e.g., a central processing unit (CPU) or an application processor (AP)) that may perform the corresponding operations by executing one or more software programs stored in a memory device.

The terms used herein are merely for the purpose of describing certain embodiments of the present disclosure but are not intended to limit the scope of the present disclosure. A singular expression may include a plural expression unless a context clearly indicates otherwise. Unless defined otherwise, all terms used herein, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even a term defined in the present disclosure may not be interpreted to exclude embodiments of the present disclosure.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a notebook computer, a workstation, a server, a personal digital assistant (PDA), a portable multimedia player (PMP), a moving picture experts group (MPEG-1) audio layer-3 (MP3) player, a mobile medical device, a camera, and a wearable device. According to an embodiment of the present disclosure, a wearable device may include at least one of an accessory type (e.g., a watch, a ring, a bracelet, an anklet, a necklace, glasses, a contact lens, or a head-mounted device (HMD)), a fabric or clothing integrated type (e.g., electronic clothing), a body-mounted type (e.g., a skin pad, or tattoo), and a bio-implantable type (e.g., an implantable circuit).

According to an embodiment of the present disclosure, an electronic device may be a home appliance. A home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

According to an embodiment of the present disclosure, an electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) devices in a shop, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment of the present disclosure, an electronic device may include at least one of a part of furniture or a building/structure, an electronic board, an electronic signature receiving device, a projector, and various kinds of measuring instruments (e.g., a water meter, an electric meter, a gas meter, and a radio wave meter). In an embodiment of the present disclosure, an electronic device may be a combination of one or more of the above-described various devices. According to an embodiment of the present disclosure, an electronic device may also be a flexible device. Further, an electronic device according to an embodiment of the present disclosure is not limited to the above-described devices, but may include an electronic device to be developed.

Hereinafter, an electronic device according to an embodiment of the present disclosure is described with reference to the accompanying drawings. In the present disclosure, the term "user" may indicate a person using an electronic device or a device (e.g. an electronic device used for artificial intelligence) using an electronic device.

FIG. 1 is a block diagram of a system in an environment of a network 100 according to an embodiment of the present disclosure.

Referring to FIG. 1, the network environment 100 includes an electronic device 101. The electronic device 101 may include a bus 110, a processor 120, a memory 130, an input/output interface 150, a display 160, and a communication interface 170. In an embodiment of the present disclosure, at least one of the above elements of the electronic device 101 may be omitted from the electronic device 101, or the electronic device 101 may additionally include other elements.

The bus 110 may include, for example, a circuit that interconnects the elements 110 to 170 and delivers a communication (e.g., a control message and/or data) between the elements 110 to 170.

The processor 120 may include one or more of a CPU, an AP, and a communication processor (CP). The processor 120 may perform, for example, calculations or process data related to control over and/or communication by at least one of the other elements 110 to 170 of the electronic device 101.

The memory 130 may include a volatile memory and/or a non-volatile memory. The memory 130 may store, for example, commands or data related to at least one of the other elements 110 to 170 of the electronic device 101. According to an embodiment of the present disclosure, the memory 130 may store software and/or a program 140. The program 140 may include, for example, a kernel 141, middleware 143, an application programming interface (API) 145, and/or an application program (or applications) 147. At least some of the kernel 141, the middleware 143, and the API 145 may be referred to as an operating system (OS).

For example, the kernel 141 may control or manage system resources (e.g., the bus 110, the processor 120, the memory 130, and the like) used to execute operations or functions implemented by the other programs (e.g., the middleware 143, the API 145, and the applications 147). Also, the kernel 141 may provide an interface capable of controlling or managing the system resources by accessing the individual elements of the electronic device 101 by using the middleware 143, the API 145, or the applications 147.

For example, the middleware 143 may serve as an intermediary that enables the API 145 or the applications 147 to communicate with the kernel 141 and to exchange data therewith.

Also, the middleware 143 may process one or more task requests received from the applications 147 according to a priority. For example, the middleware 143 may assign a priority, which enables the use of system resources (e.g., the bus 110, the processor 120, the memory 130, etc.) of the electronic device 101, to at least one of the applications 147. For example, the middleware 143 may perform scheduling, load balancing, or the like of the one or more task requests by processing the one or more task requests according to the priority assigned to the at least one of the applications 147.

The API 145 is, for example, an interface through which the applications 147 control a function provided by the kernel 141 or the middleware 143, and may include, for example, at least one interface or function (e.g., command) for file control, window control, image processing, character control, or the like.

For example, the input/output interface 150 may serve as an interface capable of delivering a command or data, which is input from a user or another external device, to the element(s) other than the input/output interface 150 within the electronic device 101. Also, the input/output interface 150 may output, to the user or another external device, commands or data received from the element(s) other than the input/output interface 150 within the electronic device 101.

Examples of the display 160 may include a liquid crystal display (LCD), a light emitting diode (LED) display, an organic LED (OLED) display, a microelectromechanical systems (MEMS) display, and an electronic paper display. For example, the display 160 may display various pieces of content (e.g., text, images, videos, icons, symbols, etc.) to a user. The display 160 may include a touch screen, and may receive, for example, a touch input, a gesture input, a proximity input, or a hovering input provided by an electronic pen or a part of a user's body.

The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the the second external electronic device 104 or the server 106.

Wireless communication may be performed by using at least one of, for example, LTE, LTE-Advanced (LTE-A), code division multiple access (CDMA), wideband CDMA (WCDMA), universal mobile telecommunications system (UMTS), Wireless Broadband (WiBro), and global system for mobile communications (GSM), as a cellular communication protocol. In addition, examples of a wireless communication may include short-range communication 164. Short-range communication 164 may be performed by using at least one of, for example, WiFi, Bluetooth, near field communication (NFC), and global navigation satellite system (GNSS). The GNSS may include at least one of, for example, a GPS, a global navigation satellite system (Glonass), a Beidou navigation satellite system (Beidou), and a European global satellite-based navigation system (Galileo), according to a use area, a bandwidth, or the like. Hereinafter, "GPS" may be interchangeably used with "GNSS." Wired communication may be performed by using at least one of, for example, a universal serial bus (USB), a high definition multimedia interface (HDMI), recommended standard 232 (RS-232), and a plain old telephone service (POTS). The network 162 may include at least one of communication networks, such as a computer network (e.g., a local area network (LAN), or a wide area network (WAN)), the Internet, and a telephone network.

Each of the first and second external electronic devices 102 and 104 may be of a type identical to or different from that of the electronic device 101. According to an embodiment of the present disclosure, the server 106 may include a group of one or more servers. All or some of the operations performed by the electronic device 101 may be performed by the first and second external electronic devices 102 and 104 or the server 106. When the electronic device 101 must perform some functions or services automatically or by a request, the electronic device 101 may send, to the first external electronic device 102, the second external electronic device 104, or the server 106, a request for performing at least some functions related to the functions or services, instead of performing the functions or services by itself, or additionally. The first external electronic device 102, the second external electronic device 104, or the server 106 may execute requested functions or additional functions, and may deliver a result of an execution to the electronic device 101. The electronic device 101 may process a received result without any change or additionally and may provide requested functions or services. Cloud computing technology, distributed computing technology, or client-server computing technology may be used.

Figure 2:
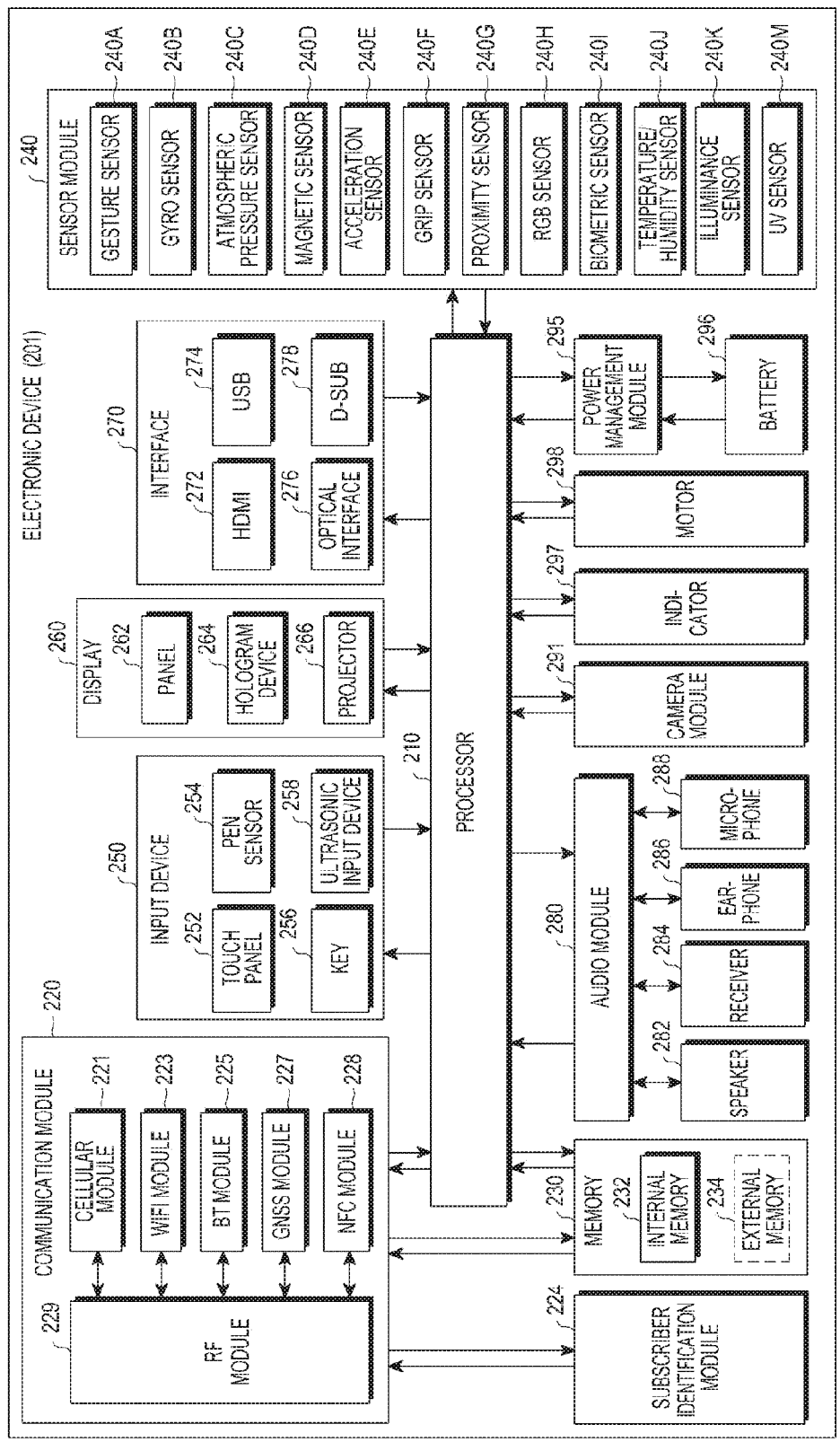
FIG. 2 is a block diagram of an electronic device according to an embodiment of the present disclosure.

FIG. 2 is a block diagram of an electronic device 201 according to an embodiment of the present disclosure. For example, the electronic device 201 may include the whole or part of the electronic device 101 illustrated in FIG. 1. The electronic device 201 may include at least one processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an OS or an application program, and may perform the processing of and arithmetic operations on various data. The processor 210 may be implemented by, for example, a system on chip (SoC). According to an embodiment of the present disclosure, the processor 210 may further include a graphics processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to that of the communication interface 170 illustrated in FIG. 1. The communication module 220 may include, for example, the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229.

For example, the cellular module 221 may provide a voice call, an image call, a text message service, an Internet service, and the like through a communication network. According to an embodiment of the present disclosure, the cellular module 221 may identify and authenticate an electronic device 201 in a communication network by using the SIM card 224. The cellular module 221 may perform at least some of the functions that the processor 210 may provide. The cellular module 221 may include a CP.

Each of the WiFi module 223, the BT module 225, the GNSS module 227, and the NFC module 228 may include, for example, a processor for processing data transmitted and received through the relevant module. According to an embodiment of the present disclosure, at least some (e.g., two or more) of the cellular module 221, the WiFi module 223, the BT module 225, the GNSS module 227, and the NFC module 228 may be included in one integrated circuit (IC) or IC package.

The RF module 229 may transmit and receive, for example, communication signals (e.g., RF signals). The RF module 229 may include, for example, a transceiver, a power amplifier module (PAM), a frequency filter, a low noise amplifier (LNA), and an antenna. According to an embodiment of the present disclosure, at least one of the cellular module 221, the WiFi module 223, the BT module 225, the GNSS module 227, and the NFC module 228 may transmit and receive RF signals through a separate RF module.

The SIM card 224 may include an embedded SIM, and may contain unique identification information (e.g., an IC card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include at least one of, for example, a volatile memory (e.g., a dynamic random access memory (DRAM), a static RAM (SRAM), a synchronous DRAM (SDRAM), etc.); a non-volatile memory (e.g., a one time programmable read only memory (OTPROM), a PROM, an erasable PROM (EPROM), an electrically erasable PROM (EEPROM), a mask ROM, a flash ROM, a flash memory (e.g., a NOT-AND (NAND) flash memory, a NOT-OR (NOR) flash memory, etc.); a hard drive; and a solid state drive (SSD).

The external memory 234 may further include a flash drive, for example, a compact flash (CF) drive, a secure digital (SD) card, a micro SD (Micro-SD) card, a mini SD (Mini-SD) card, an extreme digital (xD) card, a multimedia card (MMC), a memory stick, or the like. The external memory 234 may be functionally and/or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor), a biometric sensor 240I, a temperature/humidity sensor 240J, an illuminance sensor 240K, and an ultraviolet (UV) light sensor 240M. Additionally or alternatively, the sensor module 240 may include, for example, an electronic node (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor configured to control the sensor module 240 as a part of or separately from the processor 210, and may control the sensor module 240 while the processor 210 is in a reduced power (e.g. sleep) state.

The input device 250 may include, for example, a touch panel 252, a (digital) pen sensor 254, a key 256, and an ultrasonic input device 258. The touch panel 252 may use at least one of, for example, a capacitive scheme, a resistive scheme, an infrared scheme, or an acoustic wave scheme. In addition, the touch panel 252 may further include a control circuit. The touch panel 252 may further include a tactile layer and may provide a tactile response to a user.

The (digital) pen sensor 254 may include, for example, a recognition sheet which is a part of the touch panel or is separate from the touch panel. The key 256 may be, for example, a physical button, an optical key, or a keypad. The ultrasonic input device 258 may sense an ultrasonic wave generated by an input means through a microphone 288, and may confirm data corresponding to the sensed ultrasonic wave.

The display 260 (e.g., the display 160) may include a panel 262, a hologram device 264, and a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram device 264 may display a three-dimensional image in the air by using the interference of light. The projector 266 may display an image by projecting light onto a screen. The screen may be located, for example, internal or external to the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, and a D-subminiature (D-sub) connector 278. The interface 270 may be included in, for example, the communication interface 170 illustrated in FIG. 1. Additionally or alternatively, the interface 270 may include, for example, a mobile high-definition link (MHL) interface, an SD card/MMC MMC interface, or an Infrared Data Association (IrDA) standard interface.

For example, the audio module 280 may convert a sound to an electrical signal and vice versa. At least some elements of the audio module 280 may be included in, for example, the input/output interface 150 illustrated in FIG. 1. The audio module 280 may process sound information which is input or output through, for example, a speaker 282, a receiver 284, an earphone 286, the microphone 288, or the like.

The camera module 291 is, for example, a device capable of capturing a still image and a moving image. According to an embodiment of the present disclosure, the camera module 291 may include one or more image sensors (e.g., a front sensor or a back sensor), a lens, an image signal processor (ISP), and a flash (e.g., an LED, a xenon lamp, or the like).

The power management module 295 may manage, for example, power of the electronic device 201. According to an embodiment of the present disclosure, the power management module 295 may include a power management IC (PMIC), a charger IC, or a battery gauge. The PMIC may use a wired and/or a wireless charging method. Examples of a wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during charging. Examples of the battery 296 may include a rechargeable battery and a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include a processing unit (e.g., a GPU) for supporting a mobile television (TV). The processing unit for supporting a mobile TV may process media data according to a standard, such as, for example, digital multimedia broadcasting (DMB), digital video broadcasting (DVB), or mediaFLO™.

Each of the above-described elements of hardware according to the present disclosure may be configured with one or more components, and the names of the corresponding elements may vary based on the type of electronic device 201. According to an embodiment of the present disclosure, the electronic device 201 may include at least one of above-described elements. Some elements may be omitted or other additional elements may be further included in the electronic device 201. Also, some of the hardware components may be combined into one entity, which may perform functions identical to those of the relevant components before the combination.

Figure 3:
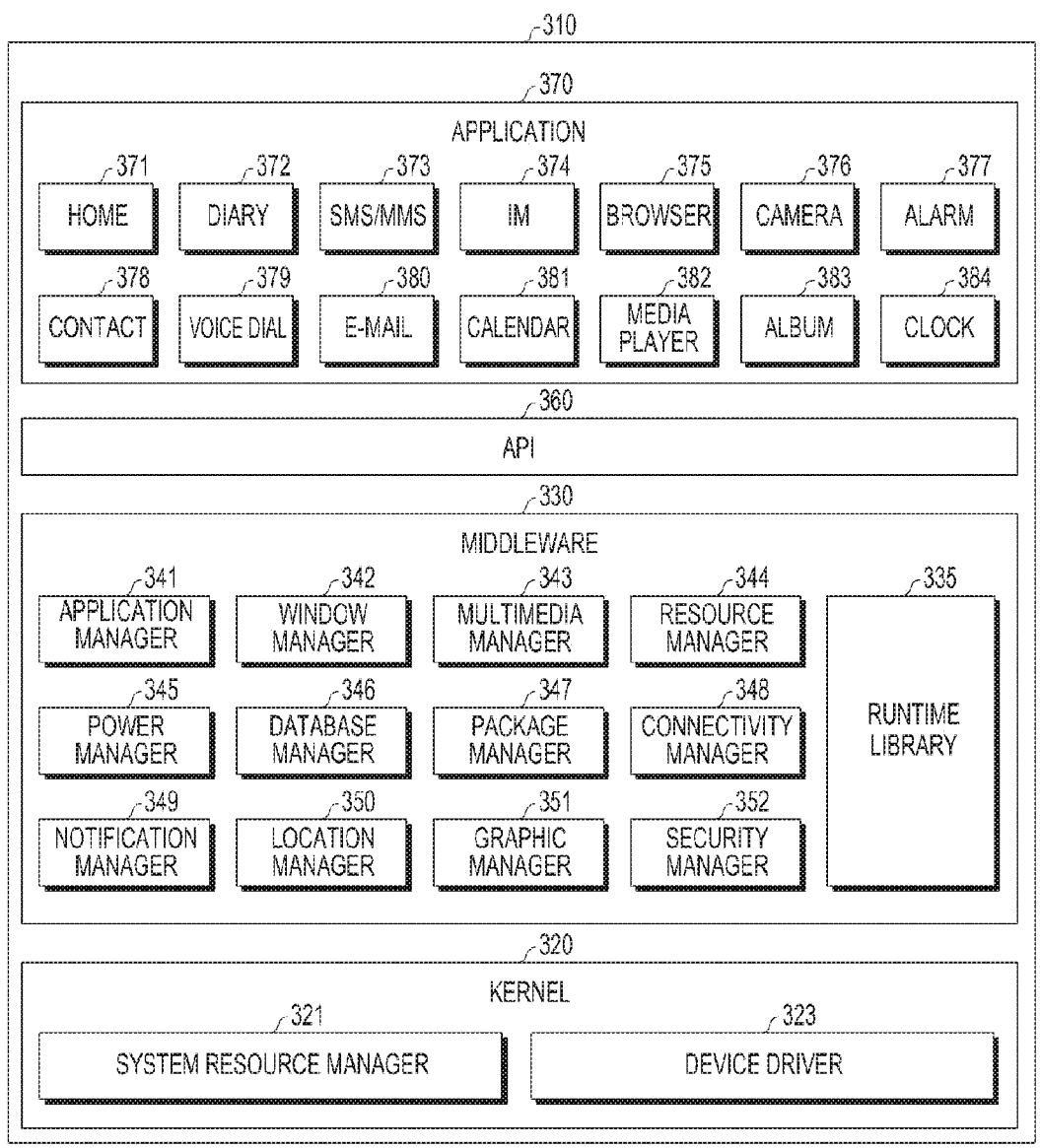
FIG. 3 is a block diagram of a program module according to an embodiment of the present disclosure.

FIG. 3 is a block diagram of a program module 310 according to an embodiment of the present disclosure.

Referring to FIG. 3, the program module 310 (e.g., the program 140) may include an OS for controlling resources related to an electronic device (e.g., the electronic device 101) and/or various applications (e.g., the applications 147) executed in an OS. An OS may be, for example, Android®, iOS, Windows®, Symbian™, Tizen®, Samsung Bada OS®, and the like.

The program module 310 may include a kernel 320, middleware 330, an API 360, and/or applications 370. At least some of the program module 310 may be preloaded on an electronic device, or may be downloaded from the first external electronic device 102 or the second external electronic 104, or the server 106.

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

For example, the middleware 330 may provide a function required in common by the application 370, or may provide various functions to the application 370 through the API 360 so as to enable the application 370 to efficiently use the limited system resources within an electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, the functionality for an arithmetic function, or the like.

The application manager 341 may manage, for example, the life cycle of at least one of the application 370. The window manager 342 may manage GUI resources used for a screen. The multimedia manager 343 may determine a format required to reproduce various media files, and may encode or decode a media file by using a coder/decoder (codec) appropriate for the relevant format. The resource manager 344 may manage resources, such as source code, memory, storage space, and the like of at least one of the application 370.

For example, the power manager 345 may operate together with a basic input/output system (BIOS), etc. and may manage a battery or power, and may provide power information and the like required for an operation of an electronic device. The database manager 346 may generate, search for, and/or change a database to be used by at least one of the application 370. The package manager 347 may manage the installation or update of an application distributed in the form of a package file.

The connectivity manager 348 may manage a wireless connection, such as, for example, WiFi or Bluetooth. The notification manager 349 may display or notify of an event, such as an arrival of a message, an appointment, a proximity notification, and the like, in such a manner as not to disturb a user. The location manager 350 may manage location information of an electronic device. The graphic manager 351 may manage a graphic effect, which is to be provided to a user, or a user interface related to a graphic effect. The security manager 352 may provide various security functions required for system security, user authentication, and the like. According to an embodiment of the present disclosure, when an electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android® or iOS®, one API set may be provided for each platform. In the case of Tizen®, two or more API sets may be provided for each platform.

The application 370 (e.g., the applications 147) may include one or more applications capable of performing functions, such as, for example, a home application 371, a diary application 372, an SMS/MMS application 373, an instant message (IM) application 374, a browser application 375, a camera application 376, an alarm application 377, a contact application 378, a voice dial 379, an email 380 application, a calendar 381 application, a media player 382 application, an album 383 application, a clock 384 application, a health care application (e.g., which measures an amount of exercise, a blood sugar level, or the like), and providing environmental information (e.g., information on atmospheric pressure, humidity, temperature, or the like).

According to an embodiment of the present disclosure, the application 370 may include an information exchange application supporting information exchange between an electronic device 101 and the first external electronic device 102 or the second external electronic device 104. Examples of an information exchange application may include a notification relay application for delivering particular information to an external electronic device and a device management application for managing an external electronic device.

For example, a notification relay application may include a function of delivering, to the first external electronic device 102 or the second external electronic device 104, notification information generated by other applications (e.g., an SMS/MMS application 373, an email application 380, a health care application, an environmental information application, etc.) of the electronic device 101. In addition, for example, a notification relay application may receive notification information from an external electronic device and may provide the received notification information to a user.

A device management application may manage (e.g., install, delete, or update), for example, at least one function (e.g., turning on/off an external electronic device (or some component parts thereof) or adjusting the brightness (or resolution) of a display) of the first external electronic device 102 or the second external electronic device 104 communicating with an electronic device, an application executed in the first external electronic device 102 or the second external electronic device 104, or a service (e.g., a telephone call service, a message service, or the like) provided by an electronic device.

According to an embodiment of the present disclosure, the application 370 may include an application (e.g., a health care application of a mobile medical device or the like) designated according to an attribute of the first external electronic device 102 or the second external electronic device 104. The application 370 may include an application received from the server 106, the first external electronic device 102, or the second external electronic device 104). The application 370 may include a preloaded application or a third party application which may be downloaded from a server. The names of the elements of the program module 310, according to an embodiment of the present disclosure illustrated in FIG. 3, may vary according to the type of OS.

According to an embodiment of the present disclosure, at least a part of the program module 310 may be implemented in software, firmware, hardware, or a combination of two or more thereof. At least some of the program module 310 may be implemented (e.g., executed), for example, by a processor 210. At least some of the program module 310 may include, for example, a module, a program, a routine, sets of instructions, a process, or the like for performing one or more functions.

Figure 4:
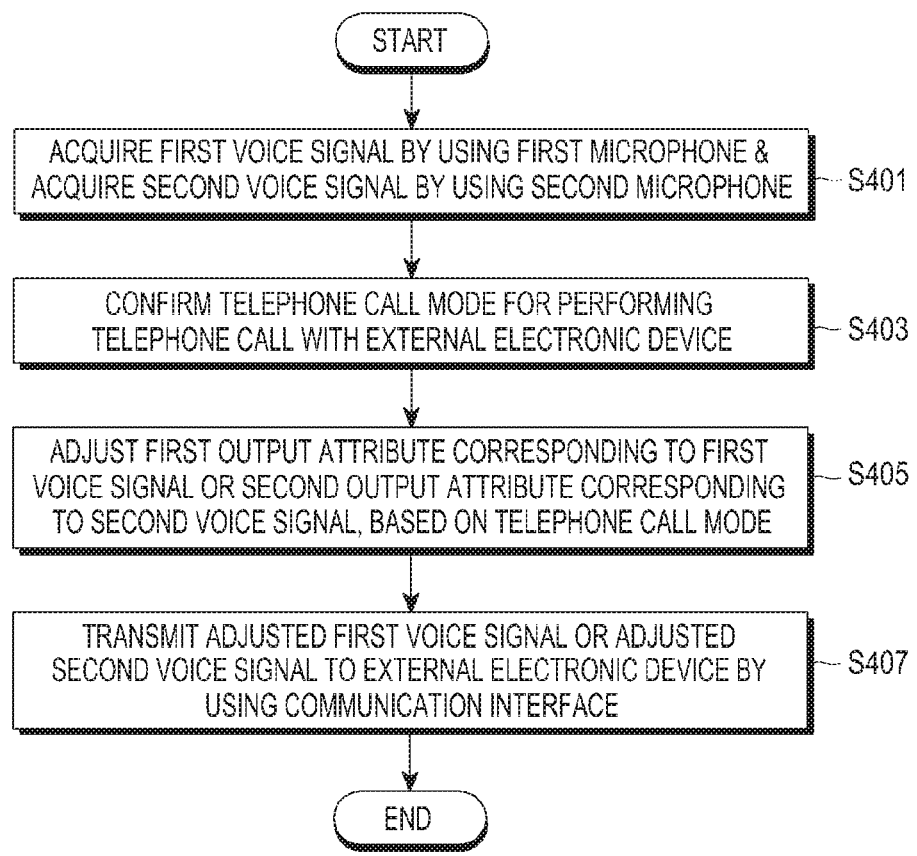
FIG. 4 is a flowchart of a method of controlling a voice signal by an electronic device according to an embodiment of the present disclosure.

FIG. 4 is a flowchart of a method of controlling a voice signal by an electronic device according to an embodiment of the present disclosure.

Referring to FIG. 4, in step S401, an electronic device 101, for example, may acquire a first voice signal by using a first microphone, and may acquire a second voice signal by using a second microphone.

For example, the electronic device 101 may include an audio module including the first microphone and/or the second microphone. The first microphone and/or the second microphone may be multiple microphones for receiving a voice signal of a first user of the electronic device 101 in order for the first user to perform a telephone call with a second user of an external electronic device 102 to which a telephone call is connected from the electronic device 101.

For example, the processor 210 of the electronic device 101 may confirm a first noise signal included in a first voice signal or a second noise signal included in a second voice signal by using the audio module, and may reduce or suppress a noise signal corresponding to the confirmed first noise signal or the confirmed second noise signal.

In step S403, the processor 210, for example, may confirm a telephone call mode for performing a telephone call with each of the external electronic devices 102 and 104. For example, the processor 210 may confirm the telephone call mode for performing a telephone call with each of the external electronic devices 102 and 104, through a telephone call execution input received through the electronic device 101.

In step S405, the processor 210, for example, may adjust a first output attribute corresponding to the first voice signal or a second output attribute corresponding to the second voice signal based on the telephone call mode.

For example, the electronic device 101 may further include a sensor configured to acquire distance information or direction information on a source of a voice signal corresponding to the first voice signal or the second voice signal, and the processor 210 may determine and adjust the output attribute of the first voice signal or the second voice signal based on the distance information or direction information acquired by the sensor. For example, the source of the voice signal may be a user.

For example, the electronic device 101 may further include a communication interface (e.g., the communication interface 170) configured to acquire state information, which corresponds to an external electronic device, from the external electronic device, and the processor 210 may adjust the output attribute of the first voice signal or the second voice signal based on the state information corresponding to the external electronic device acquired through the communication interface 170. For example, the state information on the external electronic device may include information on a relative location between each of the external electronic devices 102 and 104 and the electronic device 101 or information on whether each of the external electronic devices 102 and 104 is connected to an external audio apparatus.

Examples of the telephone call mode may include a normal telephone call mode and a speaker telephone call mode.

For example, the processor 210 may adjust the strength or type of a voice signal corresponding to the first voice signal or the second voice signal. For example, the processor 210 may separately determine and adjust respective adjustment rates of the first voice signal and/or the second voice signal.

In step S407, the processor 210, for example, may transmit the adjusted first voice signal or the adjusted second voice signal to each of the external electronic devices 102 and 104 by using the communication interface 170.

Figure 5A:
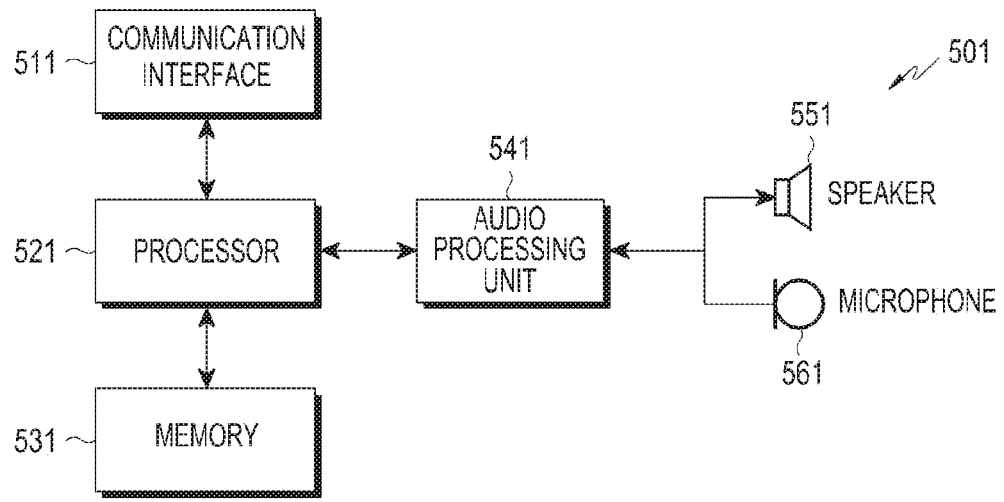
FIG. 5A is a block diagram of an electronic device according to an embodiment of the present disclosure.

FIG. 5A is a block diagram of an electronic device 501 according to an embodiment of the present disclosure.

Referring to FIG. 5A, the electronic device 501 may include a communication interface 511, a processor 521, a memory 531, an audio processing unit 541, a speaker 551, and/or a microphone 561.

According to an embodiment of the present disclosure, the speaker 551 may output telephone call voice signals of the external electronic devices 102 and 104 received through the communication interface 511.

According to an embodiment of the present disclosure, the microphone 561 may include multiple microphones including a first microphone and/or a second microphone. The multiple microphones may acquire a first voice signal and/or a second voice signal of a user of the electronic device 501, and may transmit the acquired first voice signal and/or second voice signal to the processor 521 through the audio processing unit 541.

According to an embodiment of the present disclosure, the audio processing unit 541 may acquire a first voice signal by using a first microphone, or may acquire a second voice signal by using a second microphone. The audio processing unit 541 may confirm a telephone call mode for performing a telephone call with each of the external electronic devices 102 and 104, and may adjust a first output attribute corresponding to a first voice signal and may adjust a second output attribute corresponding to a second voice signal based on the telephone call mode. For example, the audio processing unit 541 may transmit the adjusted first voice signal and the adjusted second voice signal to the external electronic devices 102 and 104 through the communication interface 511.

According to an embodiment of the present disclosure, the communication interface 511 is an example of a communication interface (e.g., the communication interface 170), and may transmit the adjusted first voice signal or the adjusted second voice signal to each of the external electronic devices 102 and 104 through multiple channels.

According to an embodiment of the present disclosure, the memory 531 may store data required for an operation of the audio processing unit 541. For example, the memory 531 may store preset adjustment rates of the first voice signal and the second voice signal or data for confirming whether a telephone call mode is a normal telephone call mode or a speaker telephone call mode.

According to an embodiment of the present disclosure, the processor 521 may control an operation of the communication interface 511, an operation of the memory 531, and/or an operation of the audio processing unit 541.

Figure 5B:
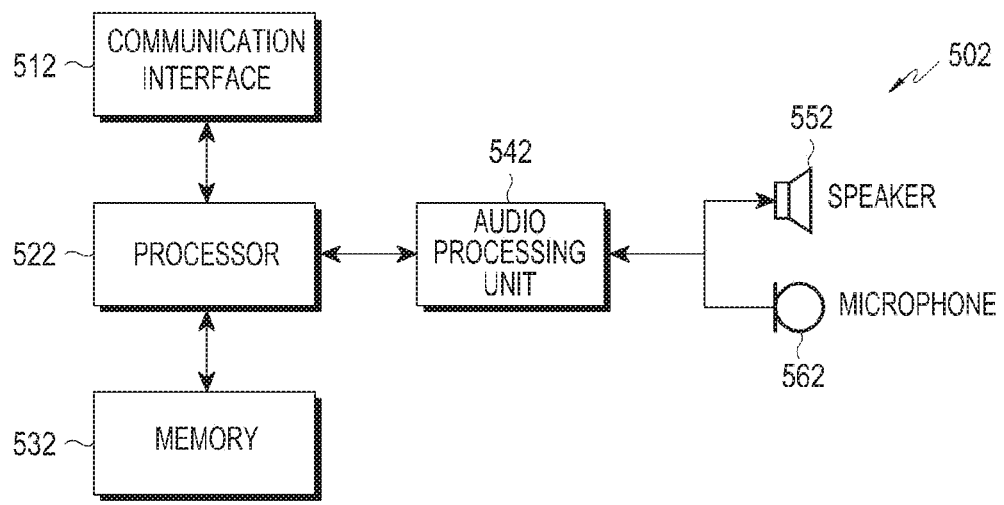
FIG. 5B is a block diagram of an external electronic device according to an embodiment of the present disclosure.

FIG. 5B is a block diagram of an external electronic device 502 according to an embodiment of the present disclosure.

Referring to FIG. 5B, identically/similarly to the configuration of the electronic device 501, the external electronic device 502 may include a communication interface 512, a processor 522, a memory 532, an audio processing unit 542, a speaker 552, and/or a microphone 562.

According to an embodiment of the present disclosure, the speaker 552 may output a first voice signal and/or a second voice signal of the first external electronic device 102 received through the communication interface 512. The first voice signal and/or the second voice signal may include, for example, an adjusted first voice signal and/or an adjusted second voice signal obtained after being adjusted by the first external electronic device 102. In addition, the microphone 562 may include a first microphone and/or a second microphone, and may acquire a voice signal of a user of the external electronic device 502 and may transmit the acquired voice signal to the processor 522 through the audio processing unit 542.

According to an embodiment of the present disclosure, identically/similarly to the audio processing unit 541 of the electronic device 501, the audio processing unit 542 of the external electronic device 502 may also acquire a first voice signal or a second voice signal by using a microphone, and the audio processing unit 542 may also confirm a telephone call mode for performing a telephone call with the electronic device 501. The audio processing unit 542 may adjust a first output attribute corresponding to the first voice signal and may adjust a second output attribute corresponding to the second voice signal based on the confirmed telephone call mode, and may transmit the adjusted first voice signal and the adjusted second voice signal to the electronic device 501 through the communication interface 512.

According to an embodiment of the present disclosure, the communication interface 512 may be configured to transmit the adjusted first voice signal or the adjusted second voice signal, which is obtained after being adjusted by the audio processing unit 542, to the electronic device 501 through multiple channels.

According to an embodiment of the present disclosure, the memory 532 may store data required for an operation of the audio processing unit 542. For example, the memory 532 may store preset adjustment rates of the first voice signal and the second voice signal or data for confirming whether a telephone call mode is a normal telephone call mode or a speaker telephone call mode.

According to an embodiment of the present disclosure, the processor 522 may control an operation of the communication interface 512, an operation of the memory 532, and/or an operation of the audio processing unit 542.

According to an embodiment of the present disclosure, the configuration is illustrated in which all of the elements, such as the communication interface 511 or 512, the processor 521 or 522, the memory 531 or 532, the audio processing unit 541 or 542, the speaker 551 or 552, and the microphone 561 or 562, are included in the one electronic device 501 or the one external electronic device 502. However, the present disclosure is not limited thereto. For example, according to the role, function, or performance of the electronic device 501, another configuration may be implemented in which at least some of the elements, such as the communication interfaces 511 and 512, the processors 521 and 522, the memories 531 and 532, the audio processing units 541 and 542, the speakers 551 and 552, and the microphones 561 and 562 are distributed among the electronic device 501 and/or the external electronic device 502 (e.g., the first external electronic device 102, the second external electronic device 104, or the server 106 illustrated in FIG. 1).

Figure 6:
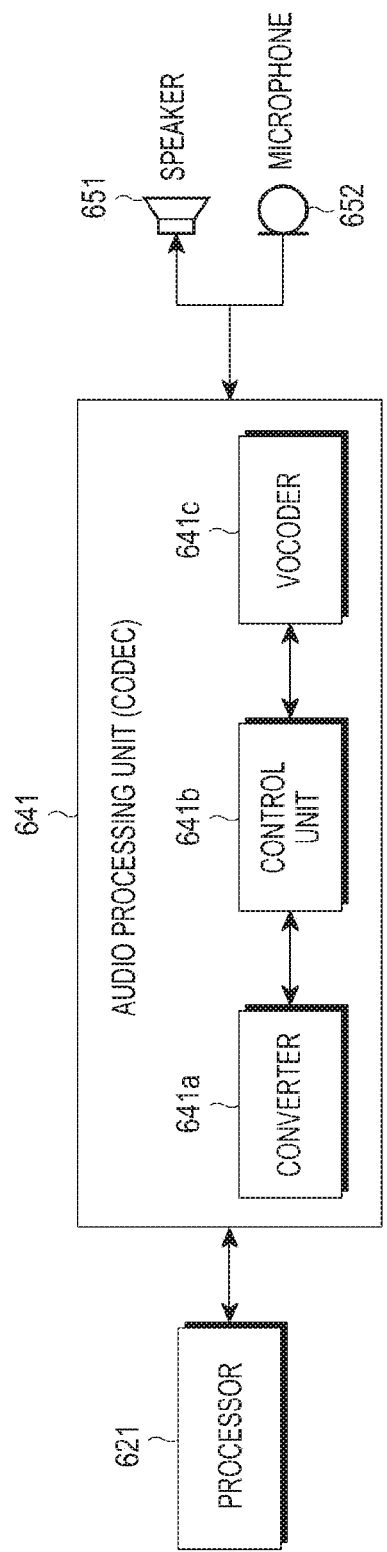
FIG. 6 is a block diagram of an audio processing unit of an electronic device or an external electronic device according to an embodiment of the present disclosure.

FIG. 6 is a block diagram of an audio processing unit 641 of an electronic device or an external electronic device according to an embodiment of the present disclosure.

Referring to FIG. 6, the microphone 561 may acquire a first voice signal and/or a second voice signal of a user of the electronic device 501, and may transmit the acquired first voice signal and/or second voice signal to the processor 621 through the audio processing unit 641.

According to an embodiment of the present disclosure, the speaker 652 may output a first voice signal and/or a second voice signal of the first external electronic device 102 received through the communication interface 512.

An operation of the audio processing unit 641 illustrated in FIG. 6 may be identical/similar to the operation performed by the audio processing unit 541 illustrated in FIG. 5A and/or the audio processing unit 542 illustrated in FIG. 5B.

Referring to FIG. 6, the audio processing unit 641 may include, for example, a converter 641a, a control unit 641b, and/or a vocoder 641c. For example, the converter 641a may convert a first voice signal and/or a second voice signal having an analog form received through a microphone 561 or 562 into a first voice signal and/or a second voice signal having a digital form. For example, the converter 641a may convert an adjusted first voice signal and/or an adjusted second voice signal having a digital form into an adjusted first voice signal and/or an adjusted second voice signal having an analog form.

For example, the control unit 641b may be configured to adjust the first voice signal or the second voice signal received through the microphone 561 or 562. According to an embodiment of the present disclosure, the control unit 641b may perform echo cancellation, noise suppression, filtering, or dynamic range compression on the first voice signal or the second voice signal received through the microphone (561 or 562.

For example, the vocoder 641c may encode a first voice signal and/or a second voice signal (e.g., an adjusted first voice signal and/or an adjusted second voice signal) to be transmitted to the external electronic device 502, or may decode a first voice signal and/or a second voice signal (e.g., an adjusted first voice signal and/or an adjusted second voice signal) received from the external electronic device 502.

Figure 7A:
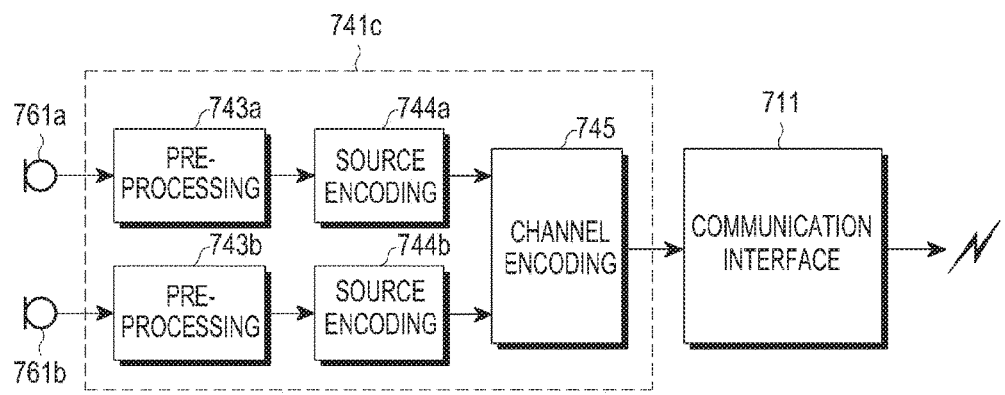
FIG. 7A is a block diagram of an electronic device in a case of a multi-channel telephone call according to an embodiment of the present disclosure.

FIG. 7A is a block diagram of an electronic device in a case of a multi-channel telephone call according to an embodiment of the present disclosure.

Referring to FIG. 7A, the electronic device may include microphones 761a and 761b, an audio processing unit 741c, and/or a communication interface 711.

According to an embodiment of the present disclosure, the first microphone 761a may acquire a first voice signal, and the second microphone 761b may acquire a second voice signal.

For example, the first voice signal and/or the second voice signal may be transmitted to the audio processing unit 741c through different multiple channels, respectively. For example, a control unit (e.g., the control unit 641b) of the audio processing unit 741c may perform pre-processing (e.g., echo cancellation, noise suppression, filtering, or dynamic range compression) on each of a first voice signal and/or a second voice signal received through respective multiple channels.

For example, a vocoder (e.g., the vocoder 641c) of the audio processing unit 741c may encode each of the pre-processed (or adjusted) first voice signal and/or second voice signal. For example, the vocoder 641c may source-encode each of a first voice signal and/or a second voice signal according to a packet scheme (e.g., an asynchronous transfer mode transmission scheme) having high transmission efficiency, and may perform channel encoding for reducing loss during the transmission of the source-encoded first voice signal and/or the source-encoded second voice signal.

For example, the communication interface 711 may transmit the channel-encoded first voice signal and/or the channel-encoded second voice signal to an external electronic device 502 through multiple channels.

Figure 7B:
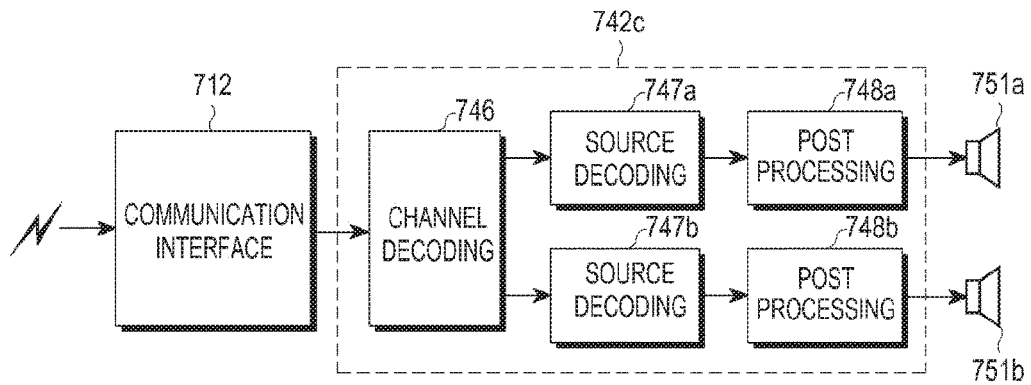
FIG. 7B is a block diagram of an external electronic device in a case of a multi-channel telephone call according to an embodiment of the present disclosure.

FIG. 7B is a block diagram of an external electronic device in a case of a multi-channel telephone call according to an embodiment of the present disclosure.

Referring to FIG. 7B, the external electronic device may include microphones 751a and 751b, an audio processing unit 742c, and/or a communication interface 712.

According to an embodiment of the present disclosure, the communication interface 712 may receive a first voice signal and/or a second voice signal from an electronic device 501 through multiple channels.

When the first voice signal and/or the second voice signal is received through the communication interface 712, the processor 522, for example, may deliver the received first voice signal and/or the received second voice signal to the audio processing unit 742c. The audio processing unit 742c, for example, may channel-decode the first voice signal and/or the second voice signal, and may source-decode each of the channel-decoded first voice signal and/or the channel-decoded second voice signal.

For example, the audio processing unit 742c of the external electronic device 502 may perform post-processing operation (e.g., echo cancellation, noise suppression, filtering, or dynamic range compression) separate from an operation of performing the pre-processing by the audio processing unit 741c of the electronic device 501.

For example, when the external electronic device 502 and the electronic device 501 perform a telephone call using multiple channels (e.g., stereo), the electronic device 501 may respectively process a first voice signal and/or a second voice signal through different multiple channels, and may transmit the processed first voice signal and/or the processed second voice signal, which is obtained after being respectively processed through the different multiple channels, to the external electronic device 502 through multiple channels. Accordingly, the external electronic device 502 using the audio processing unit 742c may perform the separate post-processing operation.

For example, when the electronic device 501 performs a telephone call using multiple channels (e.g., stereo) with the external electronic device 502, the electronic device 501 may transmit the pre-processed first voice signal and/or the pre-processed second voice signal, which is obtained after being pre-processed in the electronic device 501, to the external electronic device 502 through multiple channels.

In addition, various embodiments of the present disclosure are advantageous in that during a telephone call using multiple channels as illustrated in FIGS. 7A and 7B, the user may sense that a voice signal of a telephone call has the same high quality of music.

Figure 8:
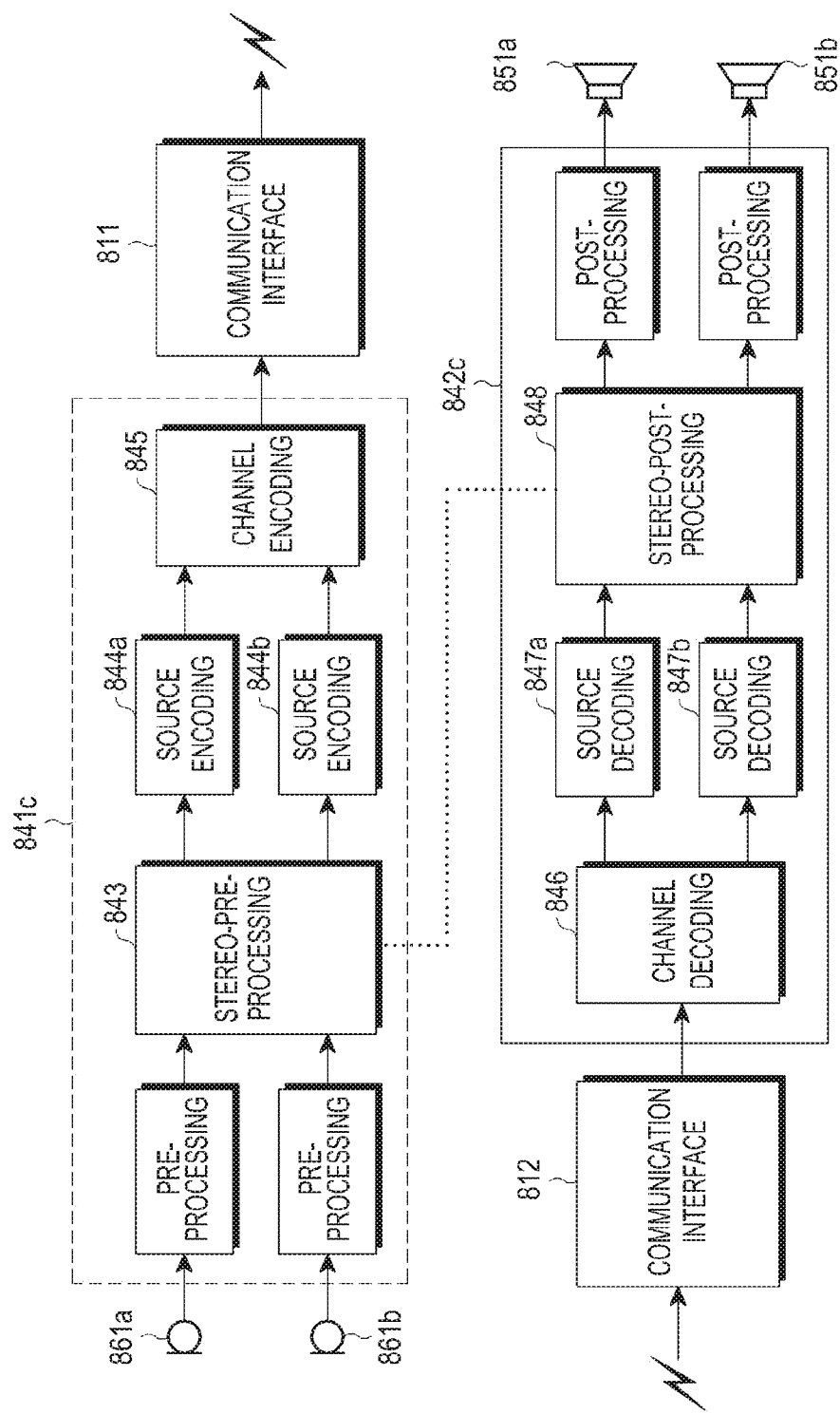
FIG. 8 is a block diagram of an electronic device and an external electronic device according to an embodiment of the present disclosure.

FIG. 8 is a block diagram of an electronic device and an external electronic device according to an embodiment of the present disclosure.

Referring to FIG. 8, the electronic device (e.g., the electronic device 501) may include, for example, microphones 861a and 861b, an audio processing unit 841c, and/or a communication interface 811.

For example, the first microphone 861a may acquire a first voice signal, and the second microphone 861b may acquire a second voice signal.

For example, when the electronic device 501 performs a telephone call using multiple channels (e.g., stereo) with the external electronic device 502, the electronic device 501 may transmit a pre-processed first voice signal and/or a pre-processed second voice signal, which is obtained after being pre-processed in the electronic device 501, to the external electronic device 502 through multiple channels.

For example, the first voice signal acquired through the first microphone 861a and/or the second voice signal acquired through the second microphone 861b may be delivered to the audio processing unit 841c through respective channels, and the audio processing unit 841c may separately process the first voice signal acquired through the first microphone 861a and/or the second voice signal acquired through the second microphone 861b.

For example, when the first voice signal acquired through the first microphone 861a and/or the second voice signal acquired through the second microphone 861b has been separately processed, the audio processing unit 841c may stereo-pre-process each of the first voice signal and/or the second voice signal before performing source encoding.

For example, the audio processing unit 841c of electronic device 501 may stereo-pre-process, source-encode, and/or channel-encode each of the first voice signal and/or the second voice signal through the audio processing unit 841c of the electronic device 501, and may transmit the adjusted first voice signal and/or the adjusted second voice signal, which is obtained after being adjusted through the audio processing unit 841c, to the external electronic device 502 through the communication interface 811.

According to an embodiment of the present disclosure, when the adjusted first voice signal and/or the adjusted second voice signal is received through a communication interface 812, the audio processing unit 842c of external electronic device 502 may channel-decode and source-decode each of the adjusted first voice signal and/or the adjusted second voice signal through an audio processing unit 842c of the external electronic device 502, and may then stereo-post-process each of the voice signals (e.g., the channel-decoded and source-decoded first voice signal and/or the channel-decoded and source-decoded second voice signal) which are obtained after being channel-decoded and source-decoded through the audio processing unit 842c.

According to an embodiment of the present disclosure, when each of the adjusted first voice signal and/or the adjusted second voice signal has been channel-decoded and source-decoded by the audio processing unit 842c and then, each of the voice signals (e.g., the channel-decoded and source-decoded first voice signal and/or the channel-decoded and source-decoded second voice signal) has been stereo-post-processed, a first output unit 851a and/or a second output unit 851b may respectively or simultaneously output the stereo-post-processed first voice signal and/or the stereo-post-processed second voice signal.

According to an embodiment of the present disclosure, at least some (e.g., pre-processing, stereo-pre-processing, source encoding, channel encoding, channel decoding, source decoding, stereo-post-processing, post-processing, etc.) of the audio processing units 841c and 842c may be implemented in software, firmware, hardware, or a combination of two or more thereof. At least some of the audio processing units 841*c* and 842*c* may be implemented (e.g., executed), for example, by a processor (e.g., the processors 521 and 522). At least some of the audio processing units 841*c* and 842*c* may include, for example, a module, a program, a routine, sets of instructions, a process, or the like for performing one or more functions.

Figure 9:
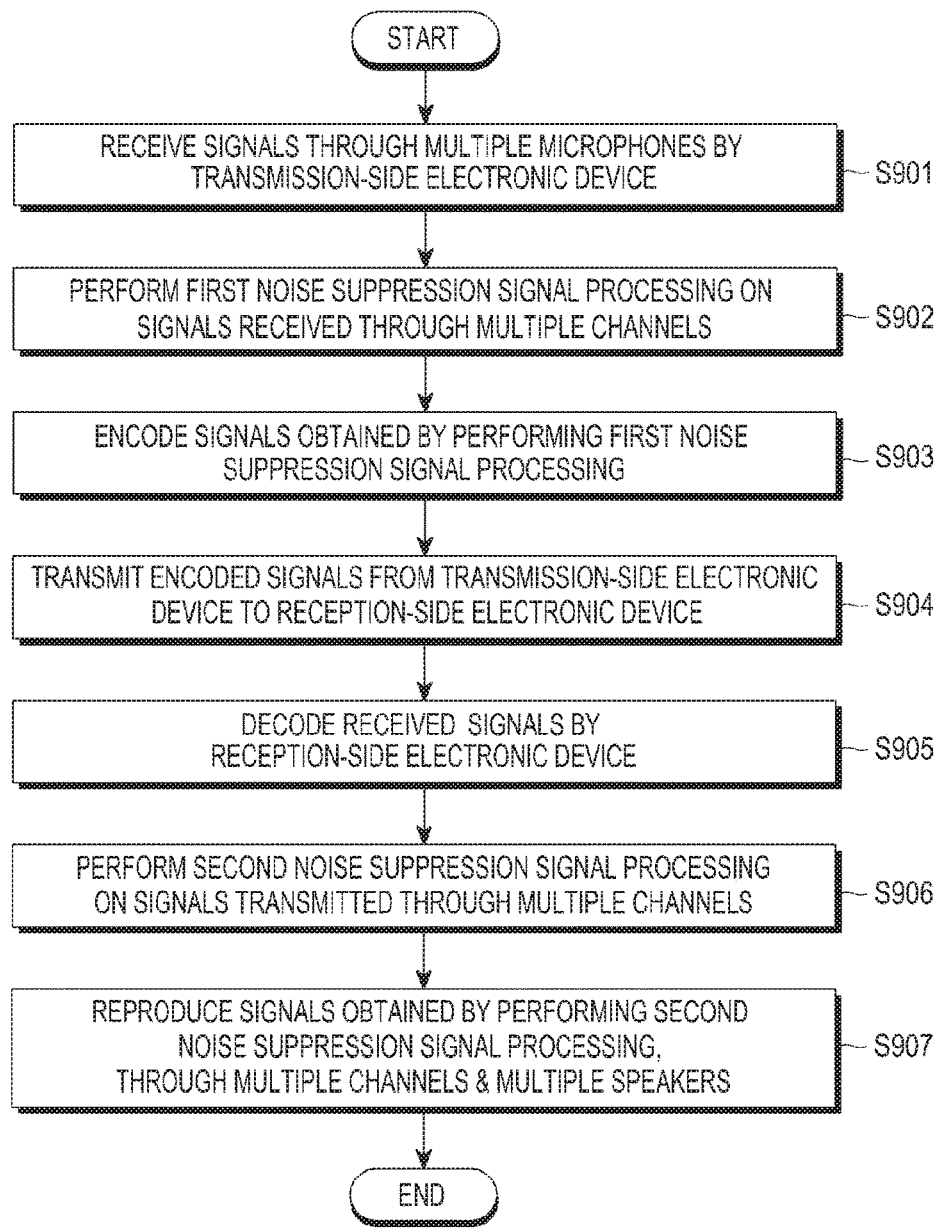
FIG. 9 is a flowchart of a method of controlling a voice signal by an electronic device according to an embodiment of the present disclosure.

FIG. 9 is a flowchart of a method of controlling a voice signal by an electronic device according to an embodiment of the present disclosure.

Referring to FIG. 9, in step S901, a transmission-side electronic device 501, for example, may receive multiple signals through multiple microphones.

In step S902, the transmission-side electronic device may perform, for example, first noise suppression signal processing (e.g., telephone call mode detection and/or strength adjustment, sound source detection and/or mixing, etc.) on multiple signals received through multiple channels.

In step S903, the transmission-side electronic device, for example, may encode the multiple signals obtained by performing the first noise suppression signal processing.

In step S904, the transmission-side electronic device, for example, may transmit the encoded signals to a reception-side electronic device 502.

In step S905, the reception-side electronic device 502, for example, may decode the multiple signals received from the transmission-side electronic device 501.

In step S906, the reception-side electronic device for example, may perform second noise suppression signal processing on the multiple signals transmitted through multiple channels.

For example, the second noise suppression signal processing operation may include an echo cancellation operation, a noise suppression operation, a filtering operation, and a dynamic range compression operation.

In step S907, the reception-side electronic device, for example, may reproduce the multiple signals, which have been received through the multiple channels and have been subjected to the second noise suppression, through multiple speakers.

The operations, or the operations (e.g., steps S401 to S407, or S901 to S907) described in the method of FIG. 4 or 9, may be executed sequentially, in parallel, repeatedly, or in a heuristic manner. For example, the operations may be executed according to another order, some of the operations may be omitted, or other operations may be added thereto.

Figure 10:
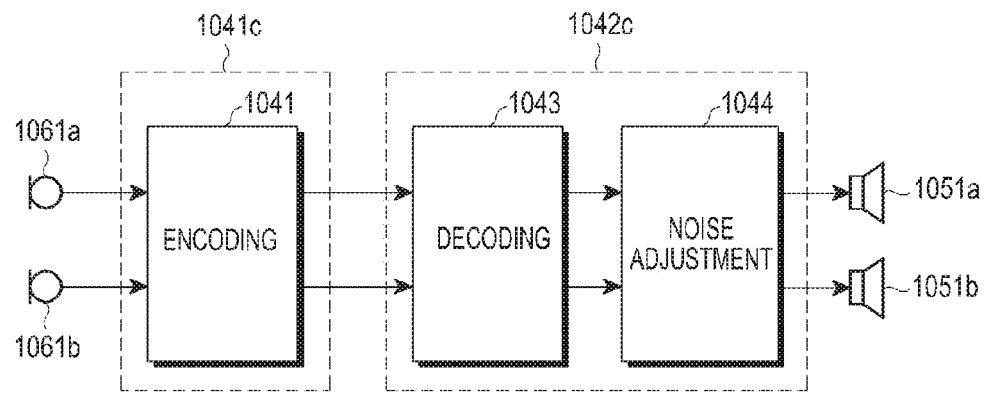
FIG. 10 is a block diagram of each of an electronic device and an external electronic device according to an embodiment of the present disclosure.

FIG. 10 is a block diagram of each of an electronic device and an external electronic device according to an embodiment of the present disclosure.

Referring to FIG. 10, for example, a first voice signal and/or a second voice signal acquired through a first microphone 1061*a* and/or a second microphone 1061*b* of the electronic device 501 may be encoded 1041 through an audio processing unit 1041*c* of the electronic device 501, and then, the encoded first voice signal and/or the encoded second voice signal may be transmitted to the external electronic device (e.g., the external electronic device 502) through a communication interface (e.g., the communication interface 511).

For example, when the electronic device 501 performs a telephone call using multiple channels (e.g., stereo) with the external electronic device 502, the electronic device 501 may transmit the pre-processed first voice signal and/or the pre-processed second voice signal, which is obtained after being pre-processed in the electronic device 501, to the external electronic device 502 through multiple channels.

According to an embodiment of the present disclosure, when the first voice signal and/or the second voice signal is received through a communication interface (e.g., the communication interface 512), a vocoder (e.g., the vocoder 641*c*) included in an audio processing unit 1042*c* of the external electronic device 502 may separately decode (as indicated by reference numeral 1043) the received first voice signal and/or the received second voice signal, and a control unit (e.g., the control unit 641*b*) of the audio processing unit 1042*c* may separately adjust (e.g., reduce or suppress) (as indicated by reference numeral 1044) noise of the decoded first voice signal and/or noise of the decoded second voice signal, which is obtained after being separately decoded, based on source information of a voice signal corresponding to the first voice signal or the second voice signal, preset telephone call mode information, or state information of the electronic device 501.

According to an embodiment of the present disclosure, when the adjusted first voice signal and/or the adjusted second voice signal, which is obtained after being adjusted through the audio processing unit 1042*c*, is channel-decoded and source-decoded and then, each of the voice signals (e.g., the adjusted first voice signal and/or the adjusted second voice signal) is stereo-post-processed, a first output unit 1051*a* and/or a second output unit 1051*b* may respectively or simultaneously output the stereo-post-processed first voice signal and/or the stereo-post-processed second voice signal.

Examples of a noise adjustment mode may include an echo cancellation mode, a noise suppression mode, a filter mode, a dynamic range compression mode, a bypass mode, a stationary noise filtering mode, a non-stationary noise filtering mode, a normal mode, and a speakerphone mode.

For example, the echo cancellation mode is an example of the noise adjustment mode for canceling a disturbance signal caused by unnecessary echo, is an example of a noise adjustment method for suppressing an echo signal, which is delivered through a transmission line in the opposite direction, so as not to disturb communication when a signal is transmitted in a particular direction or while a signal is transmitted in the particular direction, and is a method for attenuating the echo signal in such a manner as to instantaneously apply a signal attenuation amount, which is sufficient to block the echo signal, in a direction opposite to that of the echo signal.

For example, the dynamic range compression mode may be an example of a noise adjustment mode for adjusting a strength of a voice signal for each frequency domain.

For example, the bypass mode is an example of a noise adjustment mode for allowing a voice signal in a particular frequency domain to pass and blocking a voice signal in another frequency domain.

Figure 11:
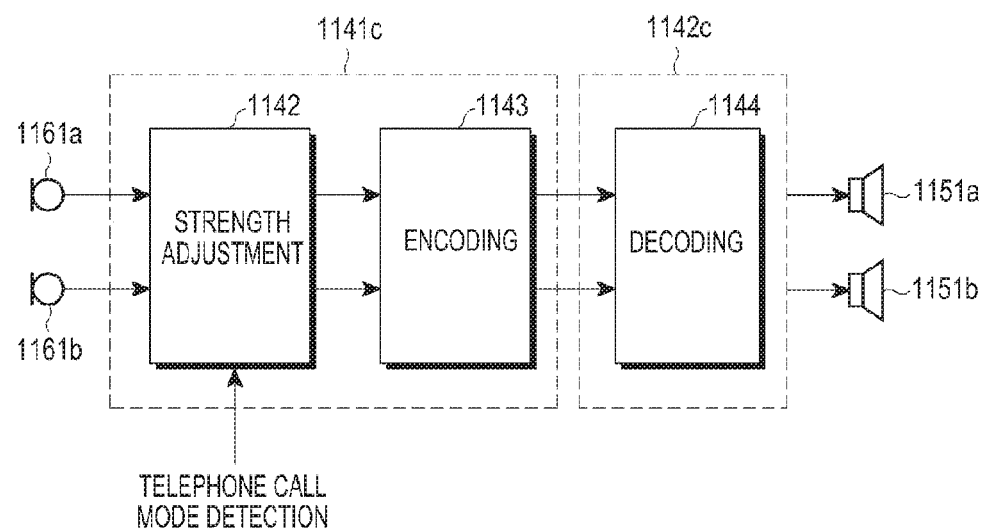
FIG. 11 is a block diagram of each of an electronic device and an external electronic device according to an embodiment of the present disclosure.

FIG. 11 is a block diagram of each of an electronic device and an external electronic device according to an embodiment of the present disclosure.

Referring to FIG. 11, when a first voice signal and/or a second voice signal is acquired through a first microphone 1161*a* and/or a second microphone 1161*b* of the electronic device (e.g., the electronic device 501), a audio processing unit 1141*c* of electronic device 501 may separately adjust respective strengths 1142 of the first voice signal and/or the second voice signal based on the detected telephone call mode information. For example, according to the normal mode for noise adjustment, when the first voice signal and/or the second voice signal is acquired, the audio processing unit 1141*c* may adjust the strengths of the respective voice signals so as to be both equal to a reference value (e.g., to equally adjust the strength of a sound of the left and that of a sound of the right).

For example, according to the speakerphone mode for noise adjustment, when a first voice signal and/or a second voice signal is acquired, the audio processing unit 1141c may adjust only a signal, of which the strength is less than a reference value among the voice signals, so as to be weighted to allow the signal to be equal to the reference value.

For example, according to the echo cancellation mode, while a first voice signal is received in a first direction and a second voice signal is received in a second direction, the audio processing unit 1141c may adjust the first voice signal and the second voice signal by respectively transmitting a first echo signal, which is delivered in a direction opposite to the first direction and is an echo signal of the first voice signal, and a second echo signal, which is delivered in a direction opposite to the second direction and is an echo signal of the second voice signal, in the first direction and in the second direction.

For example, according to the dynamic range compression mode, the audio processing unit 1141c may adjust a strength of a voice signal for each frequency domain among the frequency domains of a first voice signal and/or a second voice signal.

For example, according to the bypass mode, the audio processing unit 1141c may perform adjustment so as to allow a voice signal in a first frequency domain to pass and so as to block a voice signal in a second frequency domain among the frequency domains of a first voice signal and/or a second voice signal.

For example, when the electronic device 501 performs a telephone call using multiple channels (e.g., stereo) with the external electronic device 502, the electronic device 501 may transmit the pre-processed first voice signal and/or the pre-processed second voice signal, which is obtained after being pre-processed in the electronic device 501, to the external electronic device 502 through a communication interface (e.g., the communication interface 511).

According to an embodiment of the present disclosure, an adjusted first voice signal and/or an adjusted second voice signal, of which the respective strengths are separately adjusted, may be separately encoded 1143 by a vocoder (e.g., the vocoder 641c), the encoded first voice signal and/or the encoded second voice signal may be decoded 1144 through the vocoder 641c included in an audio processing unit 1142c of the external electronic device 502, and the decoded first voice signal and/or the decoded second voice signal may be respectively output through a first microphone 1151a and/or a second microphone 1151b.

For example, when a first voice signal and/or a second voice signal is received through multiple channels, the audio processing unit 1142c may separately decode the received first voice signal and/or the received second voice signal, and may separately apply respective three-dimensional effects (e.g., the effects in which the first voice signal and/or the second voice signal seems to echo) to the decoded first voice signal and/or the decoded second voice signal, which is obtained after being separately decoded, based on the state information of the electronic device 501.

For example, the first voice signal and/or the second voice signal, to which the respective three-dimensional effects are separately applied, may be output through the first microphone 1151a and/or the second microphone 1151b of the external electronic device 502.

For example, the state information may include distance information or direction information on a source of a voice signal corresponding to each of the first voice signal and/or the second voice signal, and accordingly, the audio processing unit 1141c may determine output attributes of the first voice signal and/or the second voice signal based on the distance information or direction information on the source of the voice signal corresponding to each of the first voice signal and/or the second voice signal, and the source may be a user corresponding to the electronic device 501. For example, the audio processing unit 1141c may apply a larger weight to a voice signal, wherein a source of the voice signal corresponding to each of the first voice signal and/or the second voice signal is distant, than to a voice signal of which a source is near, and may apply a larger weight to a voice signal from a source of the voice signal corresponding to each of the first voice signal and/or the second voice signal, which is located in a front direction of the electronic device, than to a voice signal from a source located in another direction.

For example, the state information may include location information of an external electronic device and/or information on whether the external electronic device is connected to an external audio apparatus which is acquired through a communication interface (e.g., the communication interface 511), and accordingly, the audio processing unit 1141c may determine output attributes of the first voice signal and/or the second voice signal based on the location information of the external electronic device and/or the information on whether the external electronic device is connected to the external audio apparatus. For example, when the external electronic device is connected to an external speaker, the audio processing unit 1141c may apply a larger weight to each of the first voice signal and/or the second voice signal than when the external electronic device is connected to an earphone apparatus. For example, the audio processing unit 1141c may apply a weight to each of the first voice signal and/or the second voice signal when the external electronic device is connected to the external speaker, but may not apply a weight to each of the first voice signal and/or the second voice signal when the external electronic device is connected to an earphone apparatus.

For example, the audio processing unit 1141c may adjust the strength or type of a corresponding voice signal among the acquired first voice signal and/or the acquired second voice signal. For example, the processor 521 may apply a weight so as to allow the strength of a voice signal corresponding to the acquired first voice signal to be larger than that of the acquired second voice signal. For example, the processor 521 may apply a type, which is different from the type of a voice signal corresponding to the acquired second voice signal, to the voice signal corresponding to the acquired first voice signal. For example, the processor 521 may apply a type, such as a filmic tone (e.g., a mono tone, a stereo tone, an original sound tone, and a dubbing tone) and/or a music tone (e.g., a jazz tone, an opera tone, a rock tone, etc.) to a corresponding voice signal among the first voice signal and/or the second voice signal.

Figure 12:
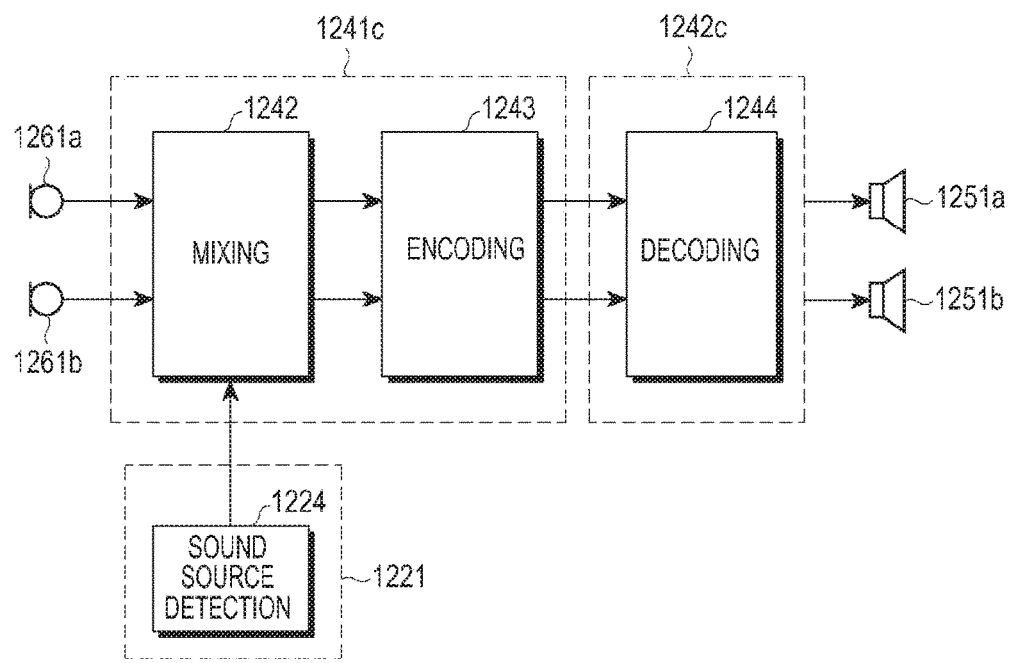
FIG. 12 is a block diagram of each of an electronic device and an external electronic device according to an embodiment of the present disclosure.

FIG. 12 is a block diagram of each of an electronic device and an external electronic device according to an embodiment of the present disclosure.

Referring to FIG. 12, for example, a first voice signal and/or a second voice signal may be acquired through a first microphone 1261a and/or a second microphone 1261b of the electronic device (e.g., the electronic device 501); when a sound source signal is detected from a sound source database 1224 included in a memory 1221; a audio processing unit 1241*c* of the electronic device 501 may mix 1242 the acquired first voice signal and the acquired second voice signal to a first channel, and may mix 1242 the acquired sound source to a second channel; a vocoder (e.g., the vocoder 641*c*) of the electronic device 501 may separately encode 1243 the first voice signal, the second voice signal, and/or the sound source signal, and may transmit the encoded first voice signal, the encoded second voice signal, and/or the encoded sound source signal to the external electronic device (e.g., the external electronic device 502); and the encoded first voice signal, the encoded second voice signal, and/or the encoded sound source signal, which are obtained after being separately encoded, may be decoded 1244 through an audio processing unit 1242*c* of the external electronic device 502. For example, the first voice signal and/or the sound source signal may be output through a first microphone 1251*a*, and the second voice signal and/or the sound source signal may be output through a second microphone 1251*b*.

Figure 13:
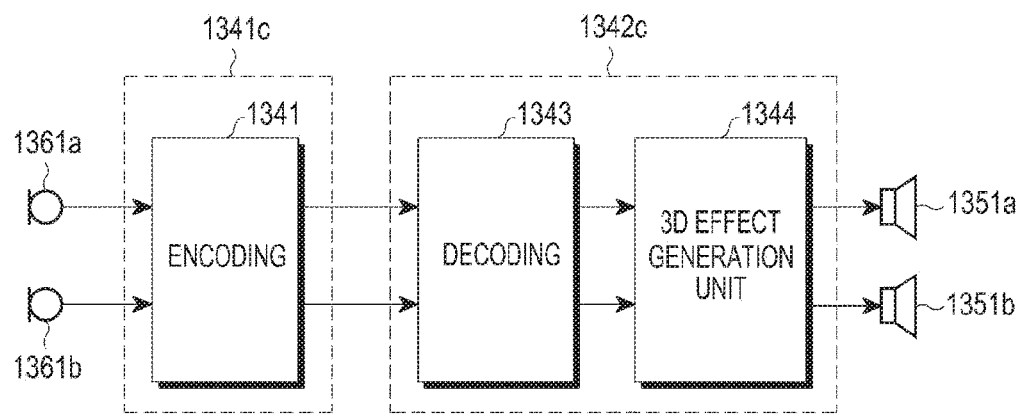
FIG. 13 is a block diagram of each of an electronic device and an external electronic device according to an embodiment of the present disclosure.

FIG. 13 is a block diagram of each of an electronic device and an external electronic device according to an embodiment of the present disclosure.

Referring to FIG. 13, for example, a audio processing unit 1341*c* of the electronic device 501 may encode 1341 a first voice signal and/or a second voice signal, which has been acquired through a first microphone 1361*a* and/or a second microphone 1361*b* of an electronic device (e.g., the electronic device 501), and may then transmit the encoded first voice signal and/or the encoded second voice signal to the external electronic device (e.g., the external electronic device 502) through a communication interface (e.g., the communication interface 511).

For example, when the electronic device 501 performs a telephone call using multiple channels (e.g., stereo) with the external electronic device 502, the electronic device 501 may transmit the pre-processed first voice signal and/or the pre-processed second voice signal, which is obtained after being pre-processed in the electronic device 501, to the external electronic device 502 through multiple channels.

According to an embodiment of the present disclosure, when a first voice signal and/or a second voice signal is received through the communication interface (e.g., the communication interface 511), a vocoder (e.g., the vocoder 641*c*) of the external electronic device 502 may separately decode (as indicated by reference numeral 1343) the received first voice signal and/or the received second voice signal, and a control unit (e.g., the control unit 641*b*) of an audio processing unit 1342*c* may separately apply (as indicated by reference numeral 1344) respective three-dimensional effects (e.g., effects in which the first voice signal and/or the second voice signal seems to echo) to the decoded first voice signal and/or the decoded second voice signal, which is obtained after being separately decoded, based on the state information of the electronic device 501. For example, the first voice signal and/or the second voice signal, to which the respective three-dimensional effects are separately applied, may be output through a first microphone 1351*a* and/or a second microphone 1351*b* of the external electronic device 502.

The term "module," as used herein, may refer to, for example, a unit including one of hardware, software, and firmware, or a combination of two or more of the hardware, software, and firmware. The term "module" may be interchangeable with a term, such as "unit," "logic," "logical block," "component," "circuit," or the like. The term "module" may indicate a minimum unit of an integrated component or a part thereof. The term "module" may indicate a minimum unit for performing one or more functions or a part thereof. The term "module" may indicate a device that may be mechanically or electronically implemented. For example, the term "module" may include at least one of an application specific IC (ASIC), a field programmable gate array (FPGA), and a programmable-logic device for performing certain operations which are known or will be developed.

According to an embodiment of the present disclosure, at least part of a device (e.g., modules or functions thereof) or a method (e.g., operations) may be implemented by, for example, an instruction stored in a non-transitory computer-readable recording medium provided in a form of a program module. If a command is executed by one or more processors (e.g., the processor 120), the one or more processors may perform a function corresponding to the command. The non-transitory computer-readable recording medium may be, for example, the memory 130.

Examples of a non-transitory computer-readable recording medium may include a hard disk, a floppy disk, magnetic media (e.g., a magnetic tape), optical media (e.g., a compact disk read only memory (CD-ROM) and a DVD), magneto-optical media (e.g., a floptical disk), a hardware device (e.g., a ROM, a random access memory (RAM), and a flash memory), and the like. In addition, examples of the program instructions may include machine language code created by a compiler and high-level language code executable by a computer by using an interpreter or the like. The above-described hardware device may be configured to operate as one or more software modules in order to perform the operations according to an embodiment of the present disclosure, and vice versa.

A module or program module according to an embodiment of the present disclosure may include one or more of the above-described elements, may further include other additional elements, or some of the above-described elements may be omitted therefrom. Operations executed by a module, a programming module, or other component elements according to an embodiment of the present disclosure may be executed sequentially, in parallel, repeatedly, or in a heuristic manner. Further, some operations may be executed according to another order or may be omitted, or other operations may be added thereto. Various embodiments of the present disclosure described herein are provided merely to describe the present disclosure and to facilitate understanding of the present disclosure, but are not intended to limit the scope of the present disclosure.

While the present disclosure has been shown and described with reference to certain embodiments thereof, it will be understood by those skilled in the art that various changes in form and detail may be made therein without departing from the scope of the present disclosure as defined by the appended claims and their equivalents.

What is claimed is:

1. A method for controlling a voice signal by an electronic device comprising a first microphone, a second microphone, a communication interface, and a processor, the method comprising:

acquiring a first voice signal by using the first microphone;

acquiring a second voice signal by using the second microphone;

performing a preprocessing for the first voice signal and the second voice signal, respectively, wherein the preprocessing includes an echo cancellation process, a noise suppression process, a filtering process and a dynamic range compression process, confirming a telephone call mode of the electronic device for performing, by the electronic device, a telephone call with an external electronic device;

adjusting a first output attribute corresponding to the preprocessed first voice signal and a second output attribute corresponding to the preprocessed second voice signal, based on the telephone call mode; and transmitting the preprocessed first voice signal wherein the first output attribute is adjusted and the preprocessed second voice signal wherein the second output attribute is adjusted to the external electronic device by using the communication interface, wherein adjusting the first output attribute and the second output attribute comprises:

acquiring information on a distance for at least one source corresponding to the first voice signal and the second voice signal from the first microphone and second microphone, respectively, and applying a first weight to the preprocessed first voice signal wherein the first output attribute is adjusted and a second weight to the second voice signal wherein the second output attribute is adjusted, based on the information on the distance acquired by a sensor of the electronic device, wherein the first weight and the second weight are different from each other.

2. The method as claimed in claim 1, wherein the method further comprises confirming a first noise signal included in the acquired first voice signal, and a second noise signal included in the acquired second voice signal by using an audio module included in the electronic device.

3. The method as claimed in claim 1, further comprising acquiring direction information on the at least one source, wherein adjusting the first output attribute and the second output attribute comprises determining the first output attribute and the second output attribute based on the direction information.

4. The method as claimed in claim 3, wherein determining the first output attribute and the second output attribute comprises designating a user corresponding to the electronic device as the at least one source.

5. The method as claimed in claim 1, wherein adjusting the first output attribute or the second output attribute further comprises:

acquiring state information corresponding to the external electronic device from the external electronic device by using the communication interface; and determining the first output attribute and the second output attribute further based on the state information.

6. The method as claimed in claim 5, wherein the state information comprises location information of the external electronic device or information on whether the external electronic device is connected to an external audio apparatus.

7. The method as claimed in claim 1, wherein confirming the telephone call mode of the electronic device comprises selecting, as the telephone call mode, one of multiple telephone call modes including a normal telephone call mode and a speaker telephone call mode.

8. The method as claimed in claim 1, wherein adjusting the first output attribute and the second output attribute further comprises adjusting a strength or type of a corresponding voice signal among the preprocessed first voice signal and the preprocessed second voice signal.

9. The method as claimed in claim 1, wherein adjusting the first output attribute and the second output attribute further comprises separately determining adjustment rates of the respective preprocessed first voice signal and the preprocessed second voice signal.

10. The method as claimed in claim 1, wherein adjusting the first output attribute and the second output attribute further comprises applying respective three-dimensional effects to the preprocessed first voice signal and the preprocessed second voice signal.

11. An electronic device, comprising:
a first microphone and a second microphone;
a communication interface;
a processor configured to:
acquire a first voice signal by using the first microphone and acquire a second voice signal by using the second microphone, perform a preprocessing for the first voice signal and the second voice signal, respectively, wherein the preprocessing includes an echo cancellation process, a noise suppression process, a filtering process and a dynamic range compression process, confirm a telephone call mode of the electronic device for performing a telephone call with an external electronic device, adjust a first output attribute corresponding to the preprocessed first voice signal and a second output attribute corresponding to the preprocessed second voice signal, based on the telephone call mode, and transmit the preprocessed first voice signal that the first output attribute is adjusted and the preprocessed second voice signal wherein the second output attribute is adjusted to the external electronic device by using the communication interface, a sensor configured to acquire information on a distance for at least one source corresponding to the first voice signal and the second voice signal from the first microphone and second microphone, respectively, wherein the processor is further configured to apply a first weight to the preprocessed first voice signal wherein the first output attribute is adjusted and a second weight to the second voice signal wherein the second output attribute is adjusted, based on the information on the distance acquired by the sensor, wherein the first weight and the second weight are different from each other.

12. The electronic device as claimed in claim 11, further comprising an audio module, wherein the processor is further configured to confirm a first noise signal included in the acquired first voice signal, and a second noise signal included in the acquired second voice signal by using the audio module.

13. The electronic device as claimed in claim 11, wherein the sensor is further configured to acquire direction information on the at least one source, wherein the processor is further configured to determine the first output attribute and the second output attribute based on the direction information.

14. The electronic device as claimed in claim 13, wherein the processor is further configured to designate a user corresponding to the electronic device as the at least one source of the corresponding voice signal.

15. The electronic device as claimed in claim 11, wherein the processor is further configured to acquire state information corresponding to the external electronic device from the external electronic device by using the communication interface, and determine the first output attribute and the second output attribute further based on the state information.

16. The electronic device as claimed in claim 15, wherein the state information comprises location information of the external electronic device or information on whether the external electronic device is connected to an external audio apparatus.

17. The electronic device as claimed in claim 11, wherein the processor is further configured to select, as the telephone call mode, one of multiple telephone call modes including a normal telephone call mode and a speaker telephone call mode.

18. A non-transitory computer-readable recording medium storing a program executed by a processor in an electronic device comprising a first microphone, a second microphone, a communication interface, a sensor, and the processor, wherein the program causes the processor to execute a method of:
- acquiring a first voice signal by using the first microphone, and acquiring a second voice signal by using the second microphone;
- performing a preprocessing for the first voice signal and the second voice signal, respectively, wherein the preprocessing includes an echo cancellation process, a noise suppression process, a filtering process and a dynamic range compression process,
- confirming distance information on least one source of a corresponding voice signal among the preprocessed first voice signal and the preprocessed second voice signal, by using the sensor;
- adjusting a first output attribute corresponding to the preprocessed first voice signal and a second output attribute corresponding to the preprocessed second voice signal, based on the distance information; and
- transmitting the preprocessed first voice signal wherein the first output attribute is adjusted and the preprocessed second voice signal wherein the second output attribute is adjusted to an external electronic device by using the communication interface,
- wherein adjusting the first output attribute and the second output attribute comprises:
- acquiring information on a distance for at least one source corresponding to the first voice signal and the second voice signal from the first microphone and second microphone, respectively, and
- applying a first weight to the preprocessed first voice signal wherein the first output attribute is adjusted and a second weight to the second voice signal wherein the second output attribute is adjusted, based on the information on the distance acquired by the sensor, wherein the first weight and the second weight are different from each other.

19. The non-transitory computer-readable recording medium as claimed in claim 18, wherein adjusting the first output attribute and the second output attribute comprises determining the first output attribute and the second output attribute further based on a telephone call mode of the electronic device for performing a telephone call with the external electronic device.

* * * * *